No. 770,898. PATENTED SEPT. 27, 1904.
C. E. FENSTERMACHER.
SWIVEL JOINT.
APPLICATION FILED MAR. 21, 1904.
NO MODEL.

WITNESSES:
C. H. Walker.
J. A. Lankford.

INVENTOR
Charles E. Fenstermacher
BY James W. Bevans
Attorney

No. 770,898. Patented September 27, 1904.

UNITED STATES PATENT OFFICE.

CHARLES E. FENSTERMACHER, OF LEHIGHTON, PENNSYLVANIA.

SWIVEL-JOINT.

SPECIFICATION forming part of Letters Patent No. 770,898, dated September 27, 1904.

Application filed March 21, 1904. Serial No. 199,239. (No model.)

*To all whom it may concern:*

Be it known that I, CHARLES E. FENSTERMACHER, a citizen of the United States, residing at Lehighton, in the county of Carbon and State of Pennsylvania, have invented new and useful Improvements in Swivel-Joints, of which the following is a specification.

This invention relates to improvements in swiveled joints for trolley-poles; and the object is to provide a very simple and effective ball-bearing joint for this purpose whereby the upper head portion of the pole may rotate independently of the lower fixed portion, thus preventing the trolley from becoming disengaged from the wire when the car is passing around a curve.

With the above object in view the invention consists in the novel features of construction hereinafter fully described, particularly pointed out in the claims, and clearly illustrated by the accompanying drawings, in which—

Figure 1:
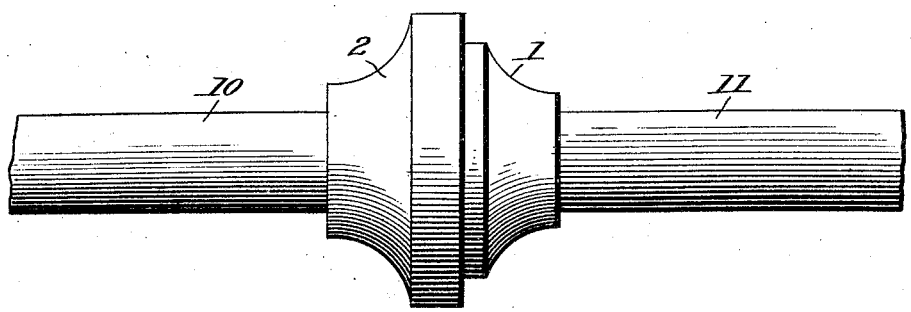
Figure 2:
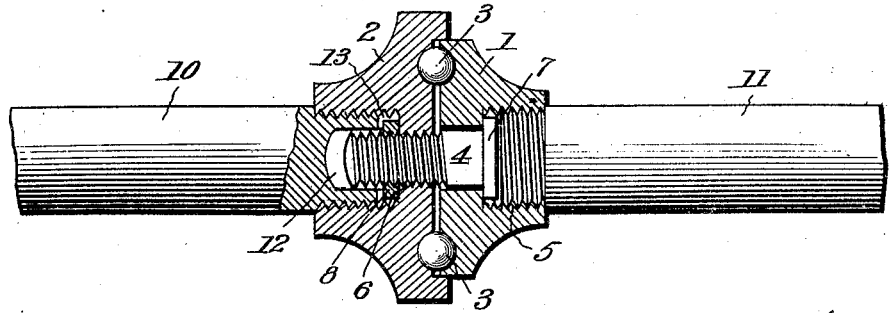
Figure 3:
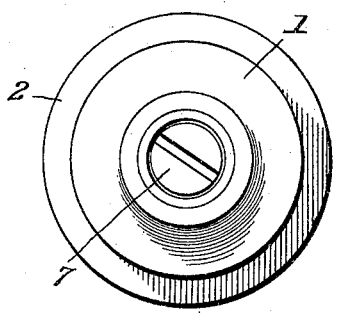
Figure 4:
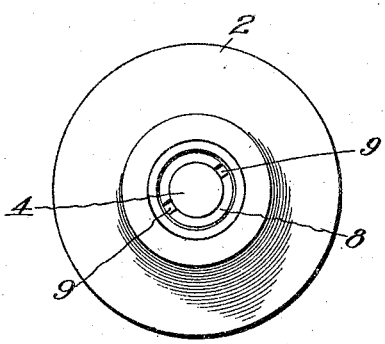

Figure 1 is an elevation of a joint constructed in accordance with my invention; Fig. 2, a similar view, partly in section; Fig. 3, an end elevation with one of the parts to be connected removed, and Fig. 4 a similar view of the opposite end of the joint.

Referring now more particularly to the said drawings, the numerals 1 and 2 designate the two members of the joint, one of which is formed with an annular recess in its end to receive the other, the meeting faces of said members being formed with annular grooves constituting together a ball-race for the antifriction-balls 3. Each of the members 1 and 2 is formed with a central opening to receive a connecting-bolt 4, which passes loosely through member 1 and is threaded through member 2. Formed in the outer end of member 1 is a screw-threaded opening 5, which is concentric with the central opening thereof, while member 2 is formed in its outer end with a similar opening 6. The head 7 of the bolt 4 is seated in opening 5, while the screw-threaded end of the bolt projects into opening 6 of member 2, the projecting portion of the bolt receiving a nut 8, provided with slots 9 for the application of a wrench. The two parts 10 and 11 of the pole to be connected by the swiveled joint have screw-threaded ends, whereby they may be screwed into the openings 5 and 6, part 10 being provided in its end with a recess 12 to receive the projecting end of the bolt and a larger recess 13 to receive the nut.

From the above description it will be seen that I have provided a very simple ball-bearing swivel-joint that may be utilized whenever it is desired to connect two parts by a swivel-joint, the invention not being limited to application to a trolley-pole.

Having thus fully described my invention, what I claim as new, and desire to secure by Letters Patent of the United States, is—

1. A joint of the character described comprising two members, each constructed to receive one of the parts to be connected, a bolt passing loosely through one of said members and threaded through the other member, a nut upon the threaded end of said bolt, and antifriction-balls arranged between the meeting faces of said members.

2. A joint of the character described comprising two members having threaded openings to receive the two parts to be connected one of said members having an opening extending therethrough concentric with the threaded opening and the other member a threaded opening in line therewith, a bolt passing through said alined openings, a nut on the threaded end of said bolt, and antifriction-balls arranged between the meeting faces of said members.

3. A joint of the character described comprising two members, one of which is formed with an annular recess in one end to receive the other, a ball-race formed between the meeting faces of said members, antifriction-balls arranged in said race, a bolt extending loosely through a central opening in one of said members and threaded through a central opening in the other member, said members formed with threaded openings in their opposite ends concentric with the central openings to receive the parts to be connected by the joint, the head of the bolt being in one of said concentric openings and the threaded end thereof projecting into the opposite opening, and a nut on said threaded end of the bolt.

In testimony whereof I have signed my name to this specification in the presence of two subscribing witnesses.

CHARLES E. FENSTERMACHER.

Witnesses:
    GEO. E. GRAY,
    H. A. BELTZ.